J. HARRIS, Jr.
FRICTION ROLLER BOX OR GUDGEON.
No. 5,452. Patented Feb. 22, 1848.
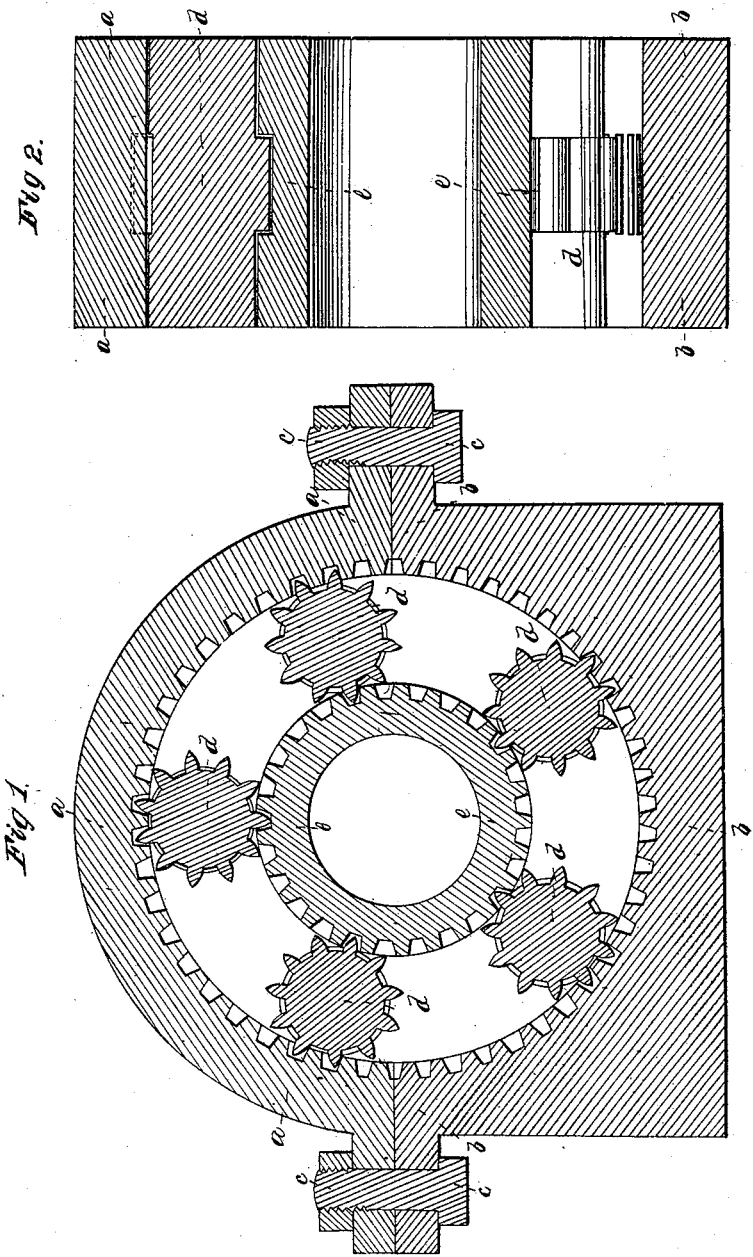

UNITED STATES PATENT OFFICE.

JOSEPH HARRIS, JR., OF BOSTON, MASSACHUSETTS.

ANTIFRICTION BOX AND AXLE.

Specification of Letters Patent No. 5,452, dated February 22, 1848.

*To all whom it may concern:*

Be it known that I, JOSEPH HARRIS, Jr., of Boston, in the county of Suffolk and State of Massachusetts, have invented certain new and useful Improvements in Boxes or Bearings for Shafting or Friction-Roller Gudgeons, and that the following description taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvement.

Figure 1, is a longitudinal vertical section and Fig. 2, is a transverse vertical section.

The great objection to friction roller boxes or gudgeons which have heretofore been devised is (where but few rollers are used which is very desirable), to keep them apart by some mechanical arrangement which will produce but little friction.

By my improved arrangement I use as few as five friction rollers (but can use more or less), and so gear them with the exterior periphery of the axle and interior perimeter of the two halves of the box, as to keep the said rollers effectually apart from each other, without by such arrangement occasioning any appreciable friction.

$a\ a\ a$—$b\ b\ b$ are the upper and lower halves respectively of the box or bearing the interior being circular, and the said halves being clamped or fastened together by screws and nuts in the usual way as shown at $c\ c\ c\ c$ Fig. 1.

$d, d, d, d, d$, Figs. 1 and 2 are the friction rollers set at proper intervals apart from each other and arranged about the axle or journal—$e\ e$, as shown in the drawings. Near the center of the breadth of the box and all around the interior periphery of the two halves of the same, spur gear teeth are formed of the width shown in Fig. 2, the face of the teeth projecting out only to the said periphery and the spaces between them being sunken from the same. Similar teeth are cut on the exterior periphery of the axle $e\ e$, and at the center of the friction rollers $d, d$, projecting teeth are formed as shown in Fig. 1, of the width and depth to match and work with the teeth aforedescribed on the two halves $a\ a\ a$—$b\ b\ b$ of the box and on the axle —$e\ e$—, the arrangement of the various teeth being such as to bring the bearing surfaces on each side of them in free contact as shown in Fig. 1.

It will be evident that in lieu of having the axle $e\ e$ revolve as it does in the arrangement above described, it may be made stationary and the rollers and box may turn upon it, so that the invention then would assume the character of an improved gudgeon as herein above suggested.

The various teeth should be cut or formed truly or upon mathematical principles, in which case the friction made by them will be only nominal.

Having thus described my improvements I shall state my claim as follows.

What I claim as my invention and desire to have secured to me by Letters Patent in friction roller boxes for shafting or gudgeons, is—

Forming the spur gear teeth on the axle, several friction rollers and interior of the box and arranging them together substantially in the manner and for the purpose herein above described.

In testimony that the foregoing is a true description of my said invention and improvements I have hereto set my signature this twenty-eighth day of June in the year 1847.

JOSEPH HARRIS, JR.

Witnesses:
EZRA LINCOLN, Jr.
ELBRIDGE HARRIS.